UNITED STATES PATENT OFFICE.

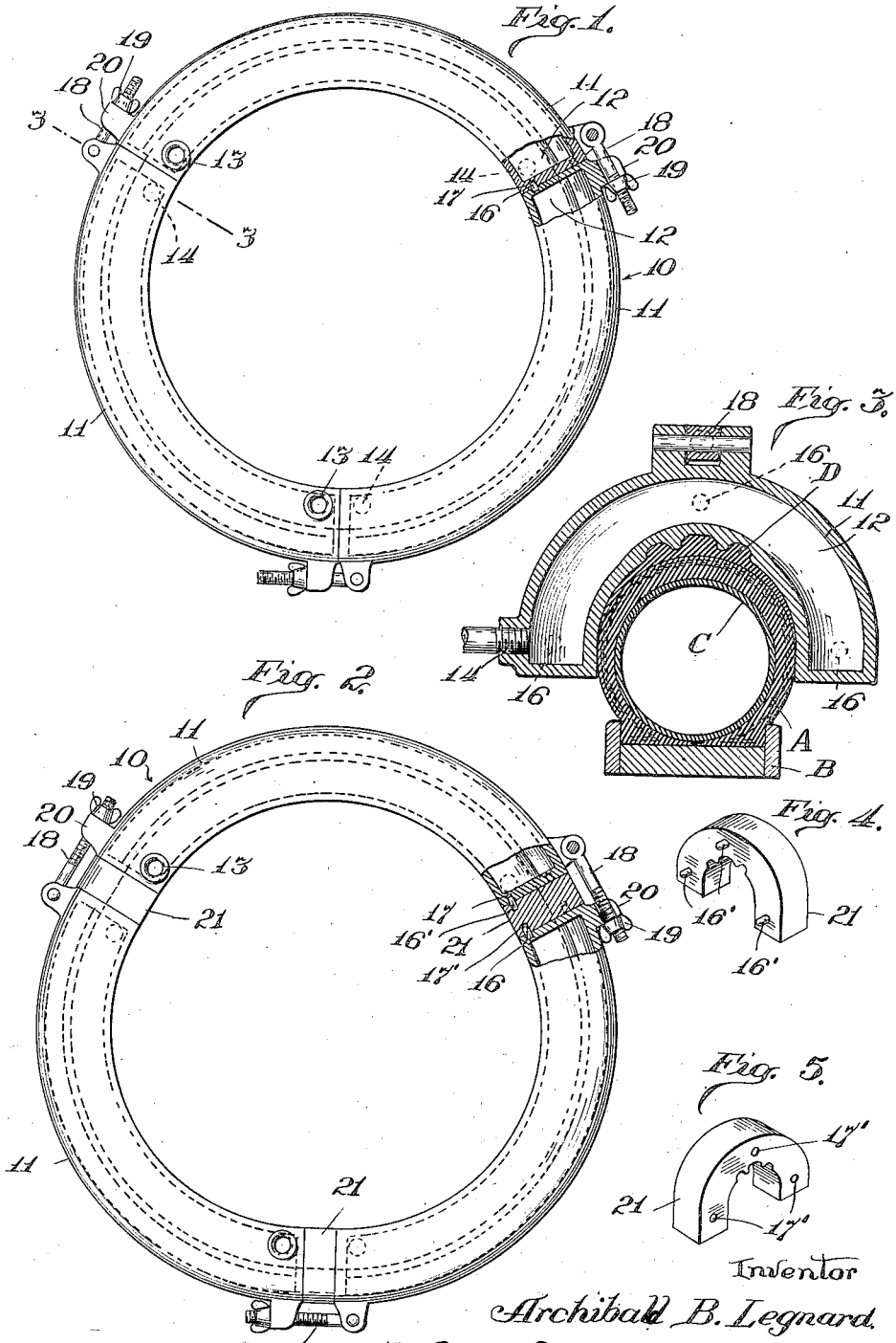

ARCHIBALD B. LEGNARD, OF WAUKEGAN, ILLINOIS.

MOLD FOR RETREADING AUTOMOBILE-TIRES.

1,368,268.

Specification of Letters Patent. Patented Feb. 15, 1921.

Application filed March 21, 1919. Serial No. 284,089.

*To all whom it may concern:*

Be it known that I, ARCHIBALD B. LEG-NARD, a citizen of the United States, residing at Waukegan, in the county of Lake and State of Illinois, have invented certain new and useful Improvements in Molds for Retreading Automobile-Tires, of which the following is a specification.

My invention relates to molds for retreading automobile tires, and has for its general object to provide a mold structure by which the required shaping and vulcanizing operation may be performed most efficiently and economically, and with respect to tires of different diameters.

Tire re-treading—that is to say removal of the worn tread (and usually the breaker strip) down to the fabric carcass of the tire, peripheral emplacement of uncured tread stock, and vulcanization thereof on and to the carcass—is usually performed as a repair-shop operation, and while the repairman engaged in such business must be equipped to handle tires of different sizes, it is naturally desirable that his mold equipment shall be simple, convenient for manual handling, and capable of utilization to retread a range of tire sizes with the least number of molds.

Heretofore the common practice in retreading tires has been to use what is known as "a third" mold,—namely a single mold member forming an arc of approximately 120 degrees,—three applications of the mold to the uncured rubber being necessary to complete the curing of the entire circumference of the tire. Also some use more expensive equipment, having for each tire-diameter a one- or two-part individual mold appropriate to that size, which mold, if made in two parts, is usually split along the middle of its circumference. Both of these equipments are objectionable, the first because in practice it is almost inevitable that at least two of the three tread segments which are successively cured shall overlap, with the resultant overcuring of that portion of the tread, and the second because of the large mold equipment that is requisite for preparation to handle an adequate line of tire circumferences, and because of the weight of the mold parts which must be handled.

My invention provides a multiple-segment expansible mold of desirable construction obviating these objections and providing a structure most satisfactory from the standpoint of results obtained and inexpensiveness of equipping for the work, as well as ease of handling.

In the drawings wherein I have shown a single embodiment of my invention, Figure 1 is a plan view of an expansible mold embodying my invention in its condition of smallest diameter. Fig. 2 shows the same mold of increased diameter; Fig. 3 is a cross section on line 3—3 showing a mold in use. Figs. 4 and 5 are details of expansion inserts.

The main frame 10 of the mold I make in a plurality of arcuate segments arranged, when placed end to end, to form approximately a circle. Each of these segments 11 is a hollow shell affording a steam chamber 12, the inner or molding face of which is of suitable conformation to mold a tire tread, each section having a steam inlet 13 near one end and a steam outlet 14 near its other end, each such orifice having suitable provision, as by threading, for connection with flexible steam-pipes. The confronting end walls have suitable provision for interlocking, accurately to position the sections in circular and planar register, dowels 16 on one end wall fitting into recesses 17, of the abutting end wall; and locking means being provided for clamping the sections against circumferential separation. Thus similar ends of the sections have locking bolts 18 carrying nuts 19 and the opposite ends have receptive parallel ears 20, these coacting as shown to lock the adjoining section. I prefer that the end wall of each section adjacent the steam inlet be relatively thin and carry the dowels 16, while the opposite wall may be made thicker and provided with the recesses 17.

Supplementing the plural sections of the mold body I provide inserts 21, which are preferably solid metal blocks, each of the same cross-section as the mold body and having provision on opposite faces, as by dowel pin 16' and recesses 17', so that one of said inserts may be placed in each joint of the plural section ring and held in circular register. The lock bolts 18 are made long enough to serve their clamping purpose when the largest inserts provided are in place.

In use the stripped carcass A is preferably mounted on a rim B in connection with a tube C which, when inflated, firmly presses the uncured tread stock D against the mold surface, the directly heated hollow sections, and heat-conducting inserts (if used) vulcanizing the tread with desirable uniformity and without overcuring any part thereof. Of course, when inserts are employed the mold is not truly round, but this fact is not material as the tire carcass is not changed in its shape by the molding operation and the retreaded tire is not detrimentally affected by this feature of the mold construction.

What I claim is:

1. A retreading mold comprising a plurality of separable arcuate sections shaped for end-to-end abutment and each presenting an internally concave molding-surface and having an interior steam chamber with provision for ingress and egress of steam, suitable inserts shaped to fit snugly between the ends of the sections to enlarge the effectively-uninterrupted perimeter of the mold-surface, and means for retaining said sections in assembled relation with or without the presence of the inserts, said means readily operable to permit separation of the sections and inserts, whereby the one equipment is usable as an approximately-round mold for tires of different tread-diameters.

2. A retreading mold comprising a plurality of arcuate sections, said sections separable on radial planes and each presenting an internally concave molding surface and having an interior steam chamber with provision for ingress and egress of steam, said sections adapted to abut end-to-end to present an effectively-uninterrupted mold surface; similar inserts, each having an internally concave molding surface and shaped for snug interposition between the adjacent ends of the two sections, for enlargement of the internal perimeter or mold surface and to present with said sections a substantially uninterrupted mold surface, and retaining means for securing said sections together with or without inclusion of said inserts.

3. A re-treading mold comprising a plurality of sections separable on radial planes, each having provision for independent heating thereof, the abutting ends of said sections having provision for retaining them in circular register, adjustable means for locking said sections together, and inserts, one for each section-abutment, similar in cross-sectional contour to the mold sections and having provision for retention in circular register with the mold sections substantially as described.

4. A re-treading mold comprising a plurality of sections for abutment end to end, each having a steam chamber with provision for ingress and egress of steam, the steam inlets being proximate to a thin end wall of the chamber, dowels on said thin wall, corresponding recesses in the opposite end wall, and inserts for each abutment having provision of dowels and recesses for holding it in circumferential register with the contiguous mold sections, and means for locking the mold sections together with or without the inclusion of said inserts.

ARCHIBALD B. LEGNARD.